(12) United States Patent
Venkatachalam et al.

(10) Patent No.: US 7,414,976 B2
(45) Date of Patent: Aug. 19, 2008

(54) METHOD AND APPARATUS TO IMPLEMENT OPERATION AND MAINTENANCE (OAM) FUNCTIONS ON A NETWORK PROCESSOR

(75) Inventors: Muthaiah Venkatachalam, Hillsboro, OR (US); Vedvyas Shanbhogue, Beaverton, OR (US); Elena Chaikovsky, Vancouver (CA); Rajendra Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 901 days.

(21) Appl. No.: 10/737,485

(22) Filed: Dec. 16, 2003

(65) Prior Publication Data

US 2005/0129054 A1    Jun. 16, 2005

(51) Int. Cl.
   *G08C 15/00* (2006.01)
(52) U.S. Cl. .................................. 370/236.2; 370/395.1
(58) Field of Classification Search ................. 370/320, 370/347, 411, 442, 428, 458, 229, 230, 230.1, 370/231, 235, 236, 236.2, 241.1, 278, 282, 370/310.1, 345, 346, 350, 357, 360, 363, 370/395.1, 395.2, 395.21, 395.6
   See application file for complete search history.

(56) References Cited

U.S. PATENT DOCUMENTS

| | | | | |
|---|---|---|---|---|
| 5,386,415 | A * | 1/1995 | Ito et al. ...................... | 370/394 |
| 5,729,529 | A * | 3/1998 | Martinsson ................. | 370/235 |
| 6,023,461 | A * | 2/2000 | Raychaudhuri et al. ..... | 370/331 |
| 7,039,044 | B1 * | 5/2006 | Whitfield et al. ............ | 370/356 |
| 7,082,111 | B2 * | 7/2006 | Amouris ...................... | 370/321 |
| 2002/0057694 | A1 * | 5/2002 | Kamo ...................... | 370/395.2 |
| 2003/0182614 | A1 * | 9/2003 | Schroeder ................... | 714/776 |
| 2004/0037286 | A1 * | 2/2004 | Huang et al. ................. | 370/394 |
| 2004/0063401 | A1 * | 4/2004 | Meckelburg et al. ........ | 455/41.1 |
| 2004/0081167 | A1 * | 4/2004 | Hassan-Ali et al. .... | 370/395.42 |
| 2005/0041633 | A1 * | 2/2005 | Roeser et al. ............... | 370/351 |
| 2005/0129027 | A1 * | 6/2005 | Costanza et al. ........ | 370/395.21 |

OTHER PUBLICATIONS

Ericsson, www.ericsson.com/support/telecom/part-g/g-8-1.shtml, "Understanding Telecommunications", Nov. 2, 2003.

(Continued)

*Primary Examiner*—Ricky Ngo
*Assistant Examiner*—Wei-Po Kao
(74) *Attorney, Agent, or Firm*—Blakely, Sokoloff, Taylor & Zafman LLP (57) ABSTRACT

A method and apparatus to insert control blocks into a stream of data user blocks. Data user blocks are transmitted onto a network during transmission slots. One of the data user blocks is buffered during one of the transmission slots. Instead of transmitting the buffered data user block during this transmission slot, a control block is transmitted onto the network in the data user block's place. Transmission of the data user block is delayed until the next transmission slot. The control block is inserted at a required position into the stream of data user blocks at a transmit engine, as opposed to a queue manager, leaving the queue manager unconcerned with the insertion details of the control block. Insertion of the control block by the transmit engine enables the queue manager to handle frames containing large numbers of user blocks as a single unit (e.g., such as is the case with AAL-5) and avoid complications related to inserting the control block in the midst of these frames.

31 Claims, 9 Drawing Sheets

OTHER PUBLICATIONS

Adiletta, Matthew et al., "The Next Generation of Intel IXP Network Processors", Intel Technology Journal, Aug. 15, 2002, pp. 6-18, vol. 6, issue 3, Intel Communications Group.

Yavatkar, Raj, "Network Processors: Building Block for Programmable Networks", pp. 1-34, Intel Communications Group.

"Testing Operations & Maintenance (OAM) Implementations for ATM", Agilent Technologies, pp. 1-20.

"ATM Guide: Quick Reference for ATM Testing", Trend Communications.

* cited by examiner

METHOD AND APPARATUS TO IMPLEMENT OPERATION AND MAINTENANCE (OAM) FUNCTIONS ON A NETWORK PROCESSOR

TECHNICAL FIELD

This disclosure relates generally to network processors, and in particular but not exclusively, relates to inserting control cells for implementing Operation and Maintenance ("OAM") functions into a stream of asynchronous transfer mode ("ATM") user cells.

BACKGROUND INFORMATION

Computer networks are becoming an increasingly important aspect of personal and professional life. Networks are used for a wide variety of services including audio, video, and data transfer. A host of specialized networks have been proposed and developed specifically to support each of these services. However, a single network solution has been developed to tackle all three services and replace existing telephone systems and specialized networks. This all-in-one solution is called Broadband Integrated Services Digital Network ("B-ISDN"). The underlying technology for B-ISDN is called asynchronous transfer mode ("ATM"). ATM networks are based on cell-switching technology, wherein each cell is 53 bytes long including a 5-byte header and a 48-byte payload.

As ATM networks are increasingly being relied upon to deliver voice, video, and data transmissions, maintaining the operational health of these networks is of increasing importance. As such, Operation and Management ("OAM") protocols have been developed to maintain the operational health of a network and manage its resources. However, implementing OAM functionality over ATM networks can be difficult.

Each time a connection is established between two users of an ATM network, a virtual path must first be established and then a virtual circuit within the virtual path selected. During this setup period, a traffic contract is negotiated between the requesting user and a network operator. The traffic contract may define such quality of service ("QoS") parameters as peak cell rate, sustained cell rate, minimum cell rate, cell variation delay tolerance, cell loss ratio, cell transfer delay, cell delay variation, and the like. Failure of the network to perform the negotiated terms of the traffic contract may lead to a breach of the traffic contract. As such, implementation of OAM functionality over an ATM network must not induce undue delay or consume needless amount of bandwidth so as to cause a breach of the traffic contract.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of an apparatus and method for inserting control cells into a stream of user cells without violating a traffic contract are described herein. As will be understood, networking devices (e.g., routers) implementing embodiments of the present invention enable insertion of control cells into streams of user cells with negligible impact on higher level protocols, such as asynchronous transfer mode ("ATM") adaptation layer 5 ("AAL-5") or the like.

In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
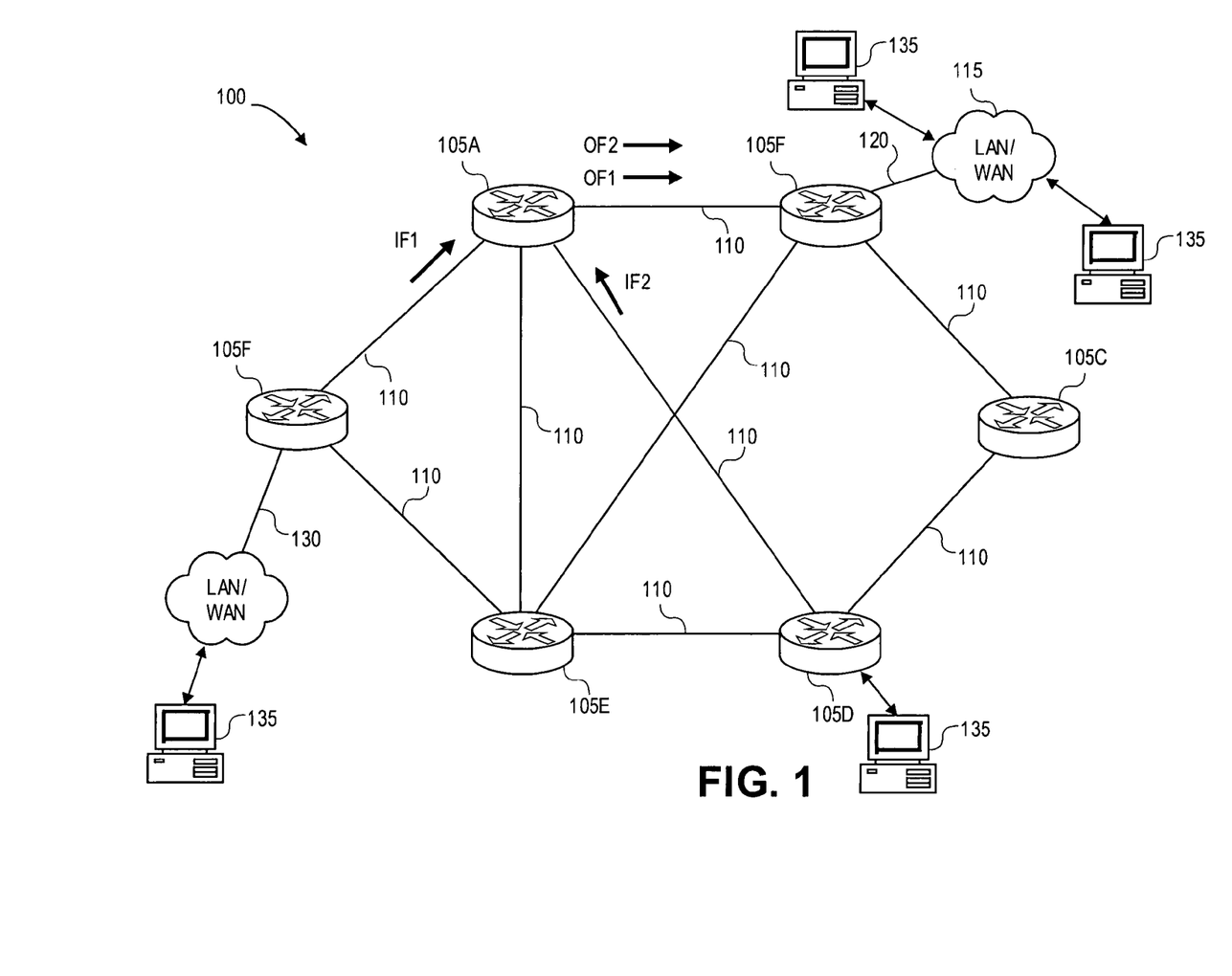
FIG. 1 is a diagram illustrating a network, in accordance with an embodiment of the present invention.

FIG. 1 is a diagram illustrating a network 100 including routers 105 interconnected by network links 110. Embodiments of network 100 may include any packet or cell switched network including wired or wireless, optical or electrical, local area network ("LAN"), wide area network ("WAN"), or the Internet. Routers 105 may also couple other LANs or WANs to network 100, such as network 115 coupled via network link 120 to router 105B and network 125 coupled via network link 130 to router 105F. Although network 100 is illustrated with five routers 105, it should be appreciated that network 100 may be scaled to include any number of routers coupled in various different patterns by more or less network links 110. Furthermore, network 100 may interconnect any number of devices, such as computers 135.

Routers 105 route packet/cell flows through network 100 from a source to a destination. A flow may traverse several routers 105 before reaching its final destination. For example, router 105A is illustrated as routing two flows F1 and F2. Each flow traversing router 105A includes an inflow into router 105A and an outflow out of router 105A. As illustrated, flow F1 includes inflow IF1 and outflow OF1, and flow F2 includes inflow IF2 and outflow OF2. Inflows may arrive at router 105A on separate network links, such as inflows IF1 and IF2 or multiple flows may arrive at router 105 on a single network link. Similarly, outflows may depart router 105 on different network links or outflows may depart from router 105 on a single network link, such as outflows OF1 and OF2.

In one embodiment, network 100 is an asynchronous transfer mode ("ATM") network. Embodiments of the present invention are adaptable to various different types of networks; however, for the sake of discussion, embodiments of the present invention will be illustrated in connection with ATM protocols. Although ATM networks transmit user data using ATM user cells, the techniques illustrated herein may be adapted for use with other transmission blocks, such as packets and frames.

In the case of an ATM network, when one of computers 135 desires to establish a connection with another of computers 135, a virtual path/channel pair is first established through network 100. In addition to establishing the virtual path/channel pair, the initiating one of computers 135 will negotiate a number of technical details. These details may include minimum cell delay, minimum cell rate, peak cell rate, and the like. These negotiations ordinarily culminate in the creation of a traffic contract specifying the negotiated details (e.g., minimum network delays, quality of service, and the like). The traffic contract is not unlike a contract between two businessmen, in that the user and the network operator undertake obligations and duties to perform, pursuant to the terms of the traffic contract. Failure on the part of the network operator to perform his obligations and duties pursuant to the traffic contract may result in a breach of the traffic contract.

Embodiments of the present invention enable network operators to implement Operations and Maintenance ("OAM") functionality over network 100 without breaching the traffic contract negotiated with a user of network 100. In short, embodiments of the present invention enable OAM functionality via the insertion of control cells into a stream or flow of user cells without inducing undue delay and without re-ordering the sequence of user cells traveling along network 100.

Figure 2:
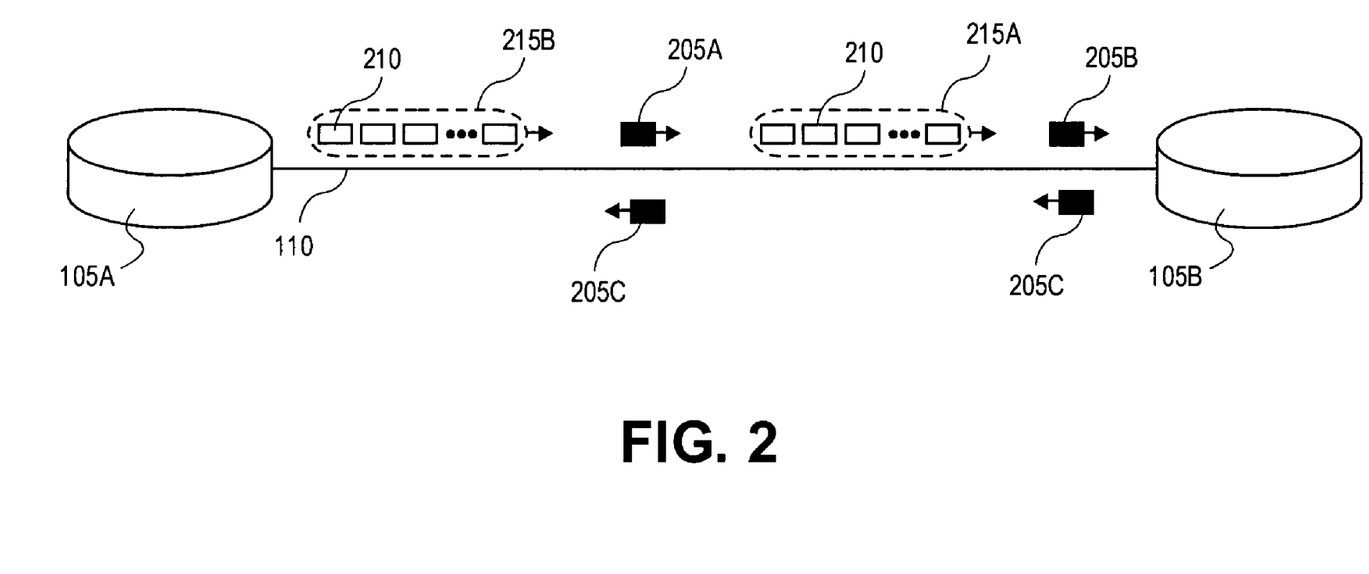
FIG. 2 is a diagram illustrating a technique of inserting control cells into a stream of user cells, in accordance with an embodiment of the present invention.

FIG. 2 is a diagram illustrating control cells 205 inserted into a stream of user cells, in accordance with an embodiment of the present invention. In the illustrated embodiment, control cells 205 are inserted between groups 215 of user cells 210. A stream of user cells 210 may include user cells from a single flow, such as flow F1, or may include user cells from multiple flows (e.g., flows F1 and F2) intermixed according to a scheduling algorithm, such deficit round robin ("DRR"), techniques consistent with the ATM Forum Traffic Management Specification, Version 4.1 (ATM Forum Document # AF-TM-0121.00), or the like.

In one embodiment, control cells 205 are inserted into the stream of user cells 210 in order to implement OAM functionality. OAM provides a standardized method for in-service network monitoring and fault management. OAM offers automatic fault detection and performance monitoring. Performance monitoring is crucial to reliable transport of voice and video traffic which require a guaranteed quality-of-service ("QoS"). OAM is specified in two standards: the ITU-T (International Telecommunications Union-Telecommunication) Recommendation I.610, B-ISDN OAM Principles and Functions, December 1995, and the Bellcore GR-1248-CORE, Generic Requirements for Operations of ATM Network Elements, Issue 2, September 1995.

To monitor network performance, embodiments of the present invention may use two types of control cells transmitted onto network 100 to enable routers 105 to share statistical information. The first type of control cells are forward performance monitoring messages ("FPMMs"), illustrated in FIG. 2 as control cells 205A and 205B. In one embodiment, the FPMMs contain an exclusive-OR "XOR" checksum (e.g., BIP-16) over the previous group of user cells 210 transmitted on network link 110. For example, control cells 205A would include an XOR checksum over group 215A. It should be appreciated that other checksum techniques may be implemented. FPMMs may further include counts of the all user cells 210 transmitted since the previous FPMM control cell was transmitted and even an independent count of the number of user cells 210 transmitted in the previous transmitted group having a Cell Loss Probability ("CLP") field set to "0".

Router 105A inserts FPMM control cells 205A and 205B into the stream of user cells 210 so that router 105B can accumulate statistical data on error rates, miss-routings, and, miss-insertions. As group 215A of user cells 210 arrives at router 105B, router 105B begins to XOR the incoming stream to generate its only XOR checksum. When router 105B received FPMM control cell 205A, router 105B compares the XOR checksum it generated against the XOR checksum contained within FPMM control cell 205A generated by router 105A. If the XOR checksums fail to match, then router 105B has received one of user cells 210 of group 215A erroneously. Performance monitoring counters in each of routers 105A and 105B maintain counts of the number of erroneously received user cells 210. Periodically, routers 105 may share the error rate with upstream routers by transmitting the second type of control cells 205, called backward reporting "BR" control cells, illustrated as control cells 205C. In one embodiment, a BR control cell is transmitted each time a FPMM control cell is received.

The insertion of control cells 205 into a stream of user cells 210 may be periodic, variable, or random. In an embodiment where control cells 205 are inserted periodically, control cells 205 are inserted every N user cells 210. Thus, in the periodic embodiment, groups 215 include N user cells 210. N may be preset by a network operator (e.g., N=128, 256, etc.) or N may be adjusted in real-time by routers 105 according to network performance demands and available bandwidth.

Figure 3:
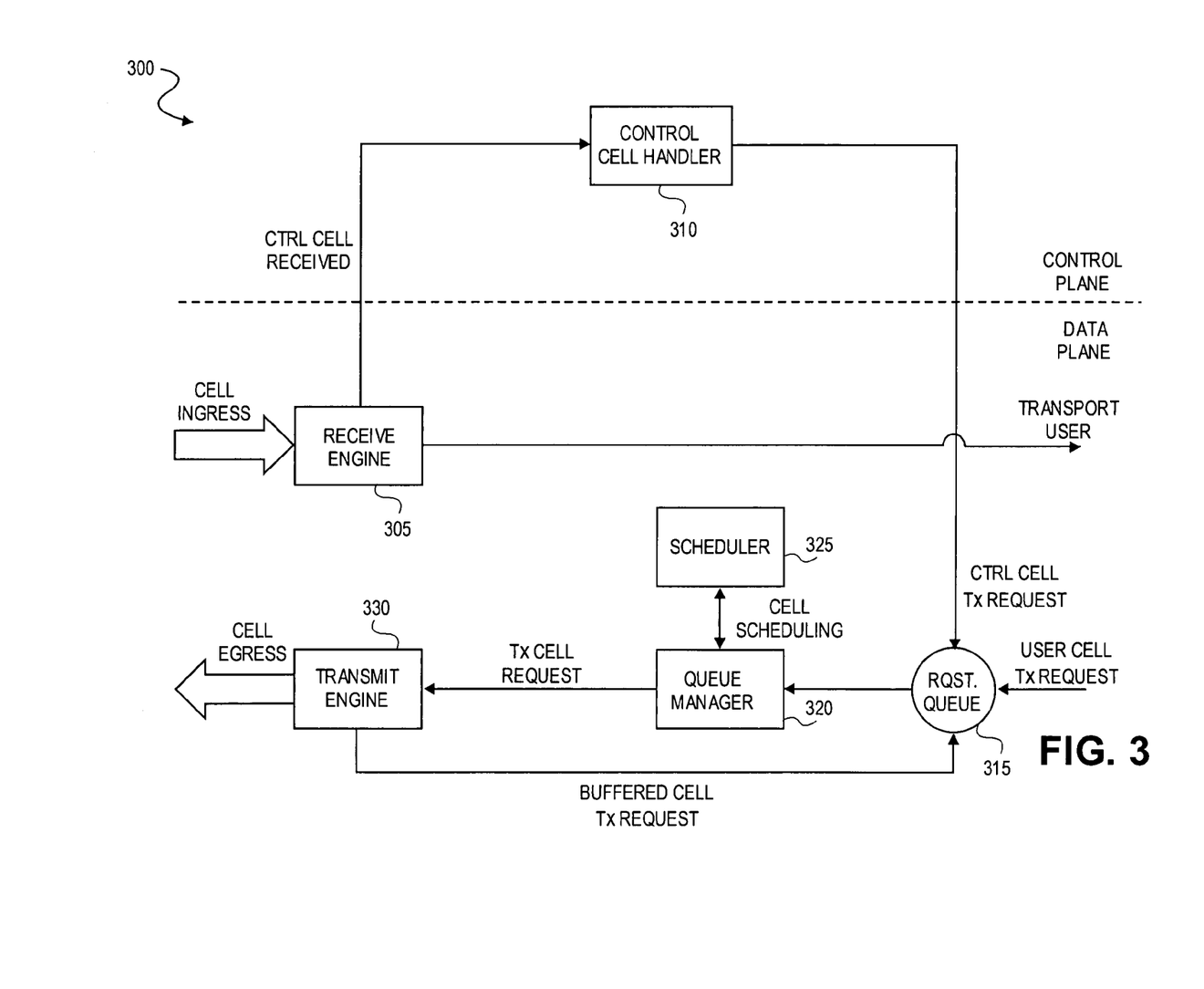
FIG. 3 is a block diagram illustrating the receive and transmit pipelines of a network processor, in accordance with an embodiment of the present invention.

FIG. 3 is a block diagram illustrating receive and transmit pipelines of a network processor 300, in accordance with an embodiment of the present invention. The illustrated embodiment of network processor 300 includes a received engine 305, a control cell handler 310, a request queue 315, a queue manager 320, a scheduler 325, and a transmit engine 330.

The components of network processor 300 are interconnection as follows. Receive engine 305 is coupled to an input port to receive cells (both user cells 210 and control cells 205) from one or more network links 110. When each cell arrives, receive engine interrogates the cell to determine whether the cells is a user cell 210 or a control cell 205 and processes the cells accordingly. If a user cell 210 arrives, receive engine 305 sends a "user cell received" signal to a transport user advising the transport user of the event. A transport user may be any higher-level protocol that transmits and receive cells over network 100, such as an IPv4 protocol layer.

On the other hand, if a control cell 205 arrives, receive engine 305 sends a "control cell received" signal to control cell handler 310 advising of the event. Control cell handler 310 processes control cells 205 to extract OAM data contained therein and take appropriate action in response, if any. For example, if control cell handler 310 is advised of the arrival of a FPMM control cell, control cell handler 310 may generate a BR control cell in response. Upon creation of the BR control cell, control cell handler 310 sends a "control cell transmit request" signal to request queue 315 (a.k.a. a request ring). Request queue 315 queues the request to be delivered to queue manager 320 in due course.

As indicated by the illustrated embodiment of FIG. 3, control cell handler 310 may reside in a control plane. Since the control plane need not process user cells 210 at full optical carrier ("OC") rates or adhere to strict ATM timing constraints, the control plane is often referred to as the "slow path." Contrastingly, the processing engines reside in the "fast path" as they must adhere to strict ATM timing constraints for processing user cells 210 within a given number of clock cycles. In one embodiment, control cell handler 310 is an Xscale™ Core produced by Intel Corporation of Santa Clara, Calif.

As mentioned above, request queue 315 queues transmit requests for queue manager 320. The transmit requests arrive either from control cell handler 310 in the form of a "control cell transmit request," from the transport user in the form of a "user cell transmit request," or from transmit engine 330 in the form of a "buffered cell transmit request." The transmit requests are delivered to queue manager 320 in due course. Queue manager 320 communicates with scheduler 325 to schedule a transmission slot for each transmit request. Once scheduler 325 indicated to queue manager to transmit a requested cell, queue manager 320 sends a "transmit cell request" signal to transmit engine 330, which transmits the requested cell in response thereto.

Figure 4A:
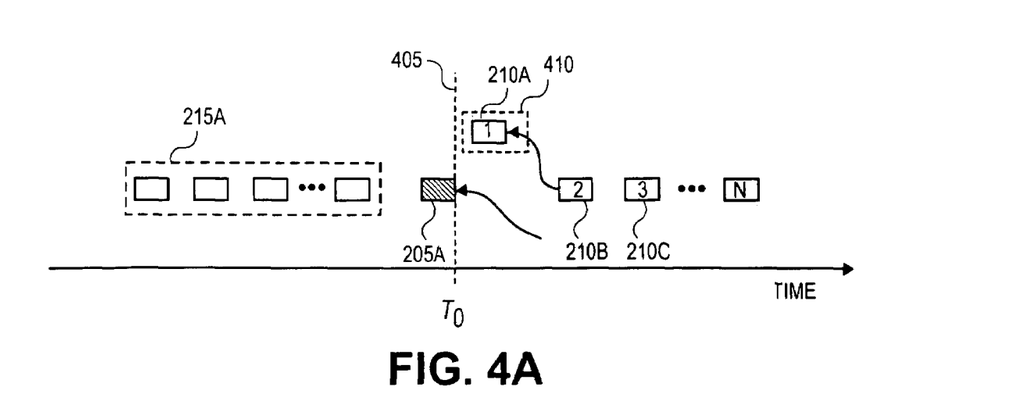
FIG. 4A is a timing diagram illustrating the transmission of a control cell in place of a user cell during a transmission slot $T_0$, in accordance with an embodiment of the present invention.
Figure 4B:
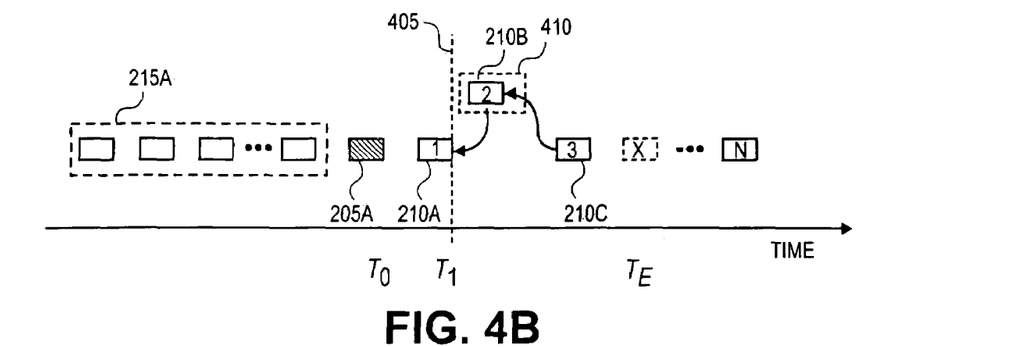
FIG. 4B is a timing diagram illustrating sequential buffering of user cells for one transmission slot prior to transmission and the scheduling of an empty transmission slot, in accordance with an embodiment of the present invention.
Figure 4C:
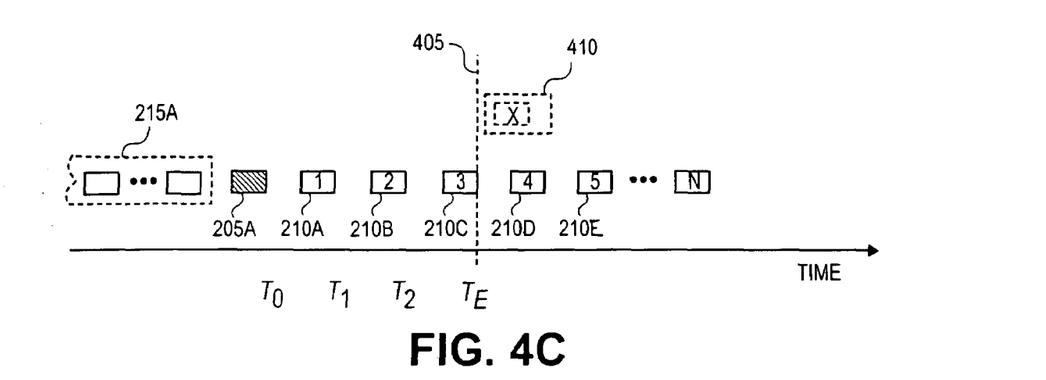
FIG. 4C are timing diagrams illustrating the transmission of a buffered user cell during an empty transmission slot to eliminate transmission delay of subsequent user cells, in accordance with an embodiment of the present invention.

FIGS. 4A-C are timing diagrams illustrating the insertion of a control cell 205A into a stream of user cells 210, in accordance with an embodiment of the present invention.

FIG. 4A illustrates the transmission of control cell 205A in place of a user cell 210A during a transmission slot $T_0$. Vertical line 405 represents a current transmission slot $T_C$, which in FIG. 4A is currently transmission slot $T_0$. Since control cell 205A is transmitted in place of user cell 210A, user cell 210A is temporarily buffered within buffer 410. In one embodiment, buffer 410 resides within transmit engine 330. In one embodiment, control cell 205A is a FPMM control cell containing a checksum calculated over all the user cells 210 of group 215A.

FIG. 4B illustrates the sequential buffering of user cells 210 for one transmission slot, prior to transmission. In FIG. 4B, the current transmission slot is now transmission slot $T_1$. During transmission slot $T_1$, user cell 210A is transmitted along a network link 110 after being temporarily buffered within buffer 410 for a period of one transmission slot. Additionally during transmission slot $T_1$, user cell 210B is temporarily buffered within buffer 410, thereby becoming the currently buffered user cell. As illustrated, each subsequent user cell 210 is sequentially buffered for one transmission slot due to the insertion of control cell 205A. In response to buffering user cell 210A during transmission slot $T_0$, transmit engine 330 sends the "buffered cell transmit request" signal to request queue 315 for delivery to queue manager 320. In response, an empty transmission slot $T_E$ is scheduled.

FIG. 4C illustrates the transmission of the currently buffered user cell 210C. User cell 210C is transmitted when empty transmission slot $T_E$ coincides with the current transmission slot $T_C$. In essence, empty transmission slot $T_E$ is a transmission slot specifically scheduled at the request of transmit engine 330 for the transmission of a user cell buffered within buffer 410. Scheduling empty transmission slot 415 may also be thought of as scheduling transmission of a buffered user cell 210. Thus, scheduling empty transmission slot $T_E$ enables transmit engine 330 to catch-up and eliminate the sequential delaying of subsequent user cells 210 (e.g., user cells 210D, 210E, etc.) for one transmission slot. It should be appreciated from FIGS. 4A-C that the techniques described herein do not upset the order in which user cells 210 are transmitted. Rather, these techniques temporarily delay a portion of one group of user cells 210 until the empty transmission slot $T_E$ is the current transmission slot, at which time transmit engine 330 catches-up from the insertion of control cell 205A. As can be seen, embodiments of the present invention preserve the ordering sequence of user cells 210.

Embodiments of the present invention enable insertion of an OAM cell (e.g., FPMM control cells, BR control cells, or the like) without unduly disturbing higher-level protocols or violating the traffic contract. As can be appreciated from FIGS. 4A-C, insertion of control cells 205 delays transmission of some user cells 210 by no more than one transmission slot. Thus, the overhead incurred by insertion of control cells 205 is minimal. Furthermore, by inserting control cells 205 with transmit engine 330, just prior to cell egress from the network processor, higher-level protocols, such as an ATM adaptation layer-5 ("AAL 5") are not unduly disturbed. AAL 5 offers several kinds of services to applications above it. For example, AAL 5 can provide reliable service (i.e., guaranteed delivery with flow control), unreliable service (i.e., no guaranteed delivery) with options to have cells with checksum error either discarded or passed to the application but reported as bad, unicast, and multicast. However, AAL 5 frames can often be quite long (perhaps greater than the threshold value N) and are enqueued as a single entity by queue manager 320. Thus, insertion of control cells 205 every N user cells 210 using normal techniques would not be possible. However, insertion of control cells 205 at transmit engine 330 ameliorates enqueuing complications that would arise if queue manager 320 were to attempt to insert one of control cells 205 in the middle of an AAL 5 frame.

Figure 5:
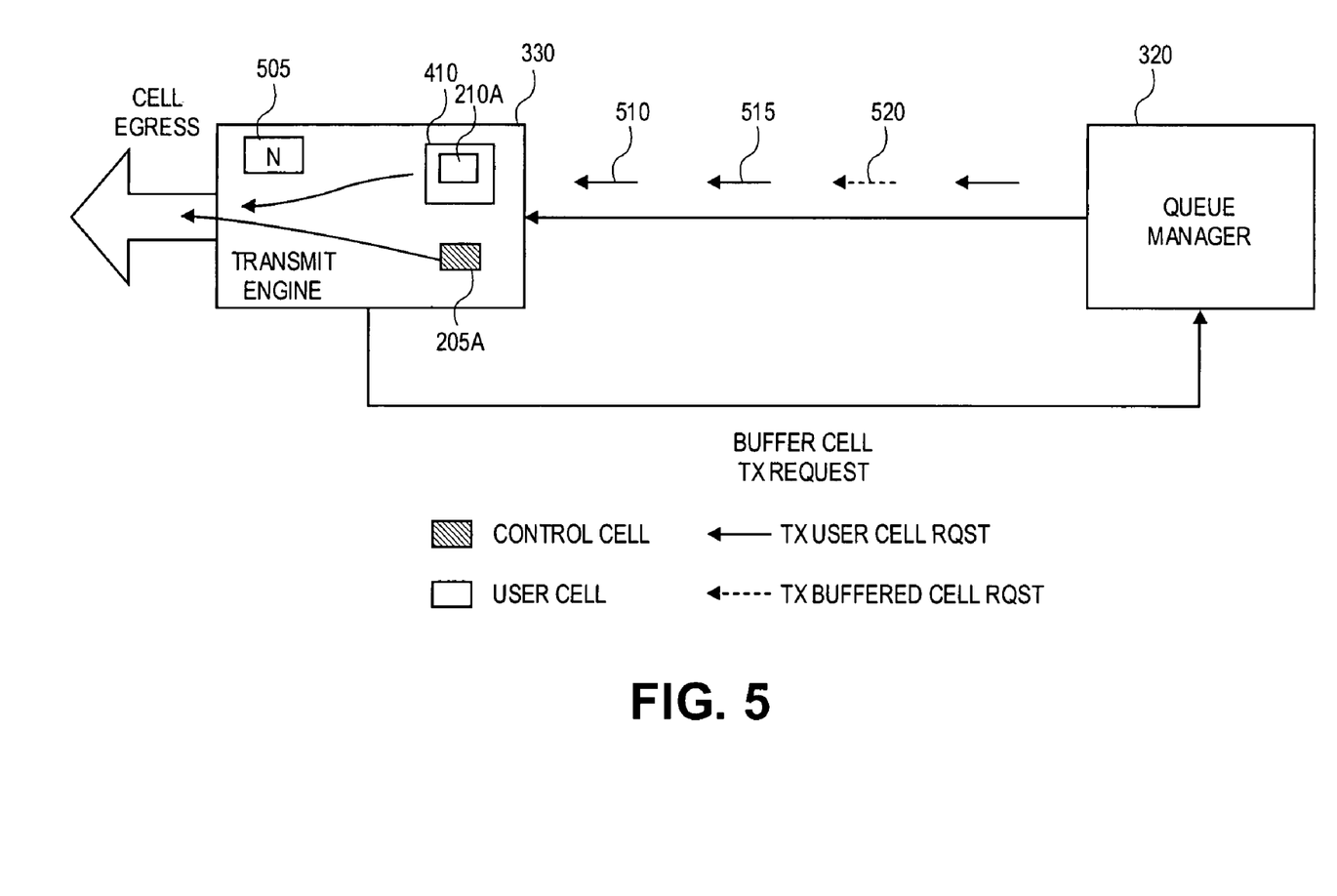
FIG. 5 is a block diagram illustrating signaling between a queue manager and a transmit engine for inserting a control cell into a stream of user cells every N user cells, in accordance with an embodiment of the present invention.

FIG. 5 is a block diagram illustrating signaling between queue manager 320 and transmit engine 330. It should be appreciated that request queue 315 has been omitted from FIG. 5 only for the sake of clarity. Each time transmit engine 330 transmits a user cell 210 onto network 100 a cell counter 505 is incremented. In one embodiment, when cell counter 505 reaches N (for example N=128, 256, etc.), transmit engine 330 transmits control cell 205A onto network 100 in place user cell 210A. In response, transmit engine 330 buffers user cells 210A and issues a "buffered cell transmit request" signal to queue manager 320. In response, queue manager 320 requests scheduler 325 to schedule an empty transmission slot for a buffered user cell. However, the empty transmission slot may not be scheduled immediately due to processing delays incurred at request queue 315, queue manager 320, and scheduler 325. Therefore, queue manager 320 continues to issue "transmit user cell requests," illustrated as signals 510 and 515 to transmit engine 330 while the empty transmission slot is scheduled. When the empty transmission slot coincides with the current transmission slot, queue manager 320 issues a "transmit buffered cell request," illustrated as signal 520, to transmit engine 330. In response, transmit engine 330 will transmit the currently buffered one of user cells 210 to catch-up and eliminate the delay. It should be appreciated that by the time transmit engine 330 receives signal 520, the currently buffered user cell will no longer be user cell 210A, but rather a subsequent user cell in the stream of user cells 210.

Figure 6:
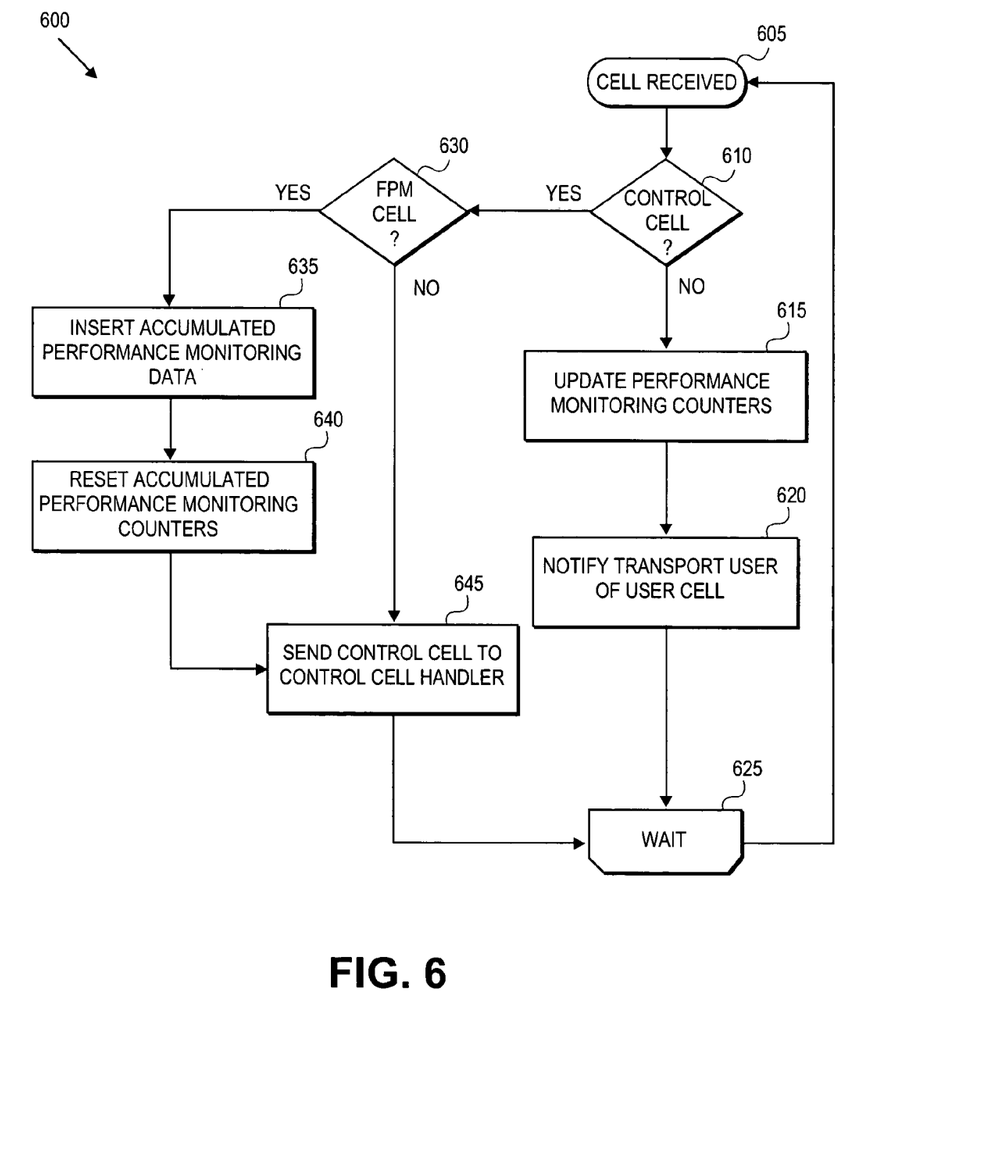
FIG. 6 is a flow chart illustrating operation of a receive engine of a network processor, in accordance with an embodiment of the present invention.

FIG. 6 is a flow chart of a process 600 illustrating operation of receive engine 305, in accordance with an embodiment of the present invention. In a process block 605, receive engine 305 receives a cell from network 100.

In decision block 610, receive engine 305 examines the cell to determine what type of cell has arrived. If a user cell 210 is received, process 600 continues to process block 615. In process block 615, receive engine 305 updates performance monitoring counters to reflect the newly arrived user cell 210. In process block 620, receive engine 305 notifies the transport user of the arrival of a user cell 210. Process 600 then continues to a process block 625 where receive engine 305 awaits the arrival of another cell from network 100. From process block 625, process 600 returns to process block 605 and continues therefrom as described above.

Returning to decision 610, if the received cell is a control cell 205, then process 600 continues to decision block 630. In decision block 630, if the received control cell is a FPMM control cell, then process 600 continues to a process block 635, In process block 635, receive engine 305 inserts performance monitoring data, that has accumulated due to user cells 210 received since the last control cell 205 was received, into the FPMM control cell. Once the accumulated performance monitoring data has been inserted into the received control cell, received engine 305 resets its performance monitoring counters (process block 640). In a process block 645, receive engine 305 forwards the control cell with the accumulated performance data piggybacked thereon to control cell handler 310 for processing. Process 600 then continues to process block 625 where received engine 305 awaits the arrival of the next cell.

Returning to decision block 630, if the received control cell is not a FPMM control cell, then received engine 305 forwards the received control cell directly to control cell handler 310 for immediate processing. Thus, embodiments of the present invention enable control cells 205 to be used for other management functions than just performance monitoring.

Figure 7:
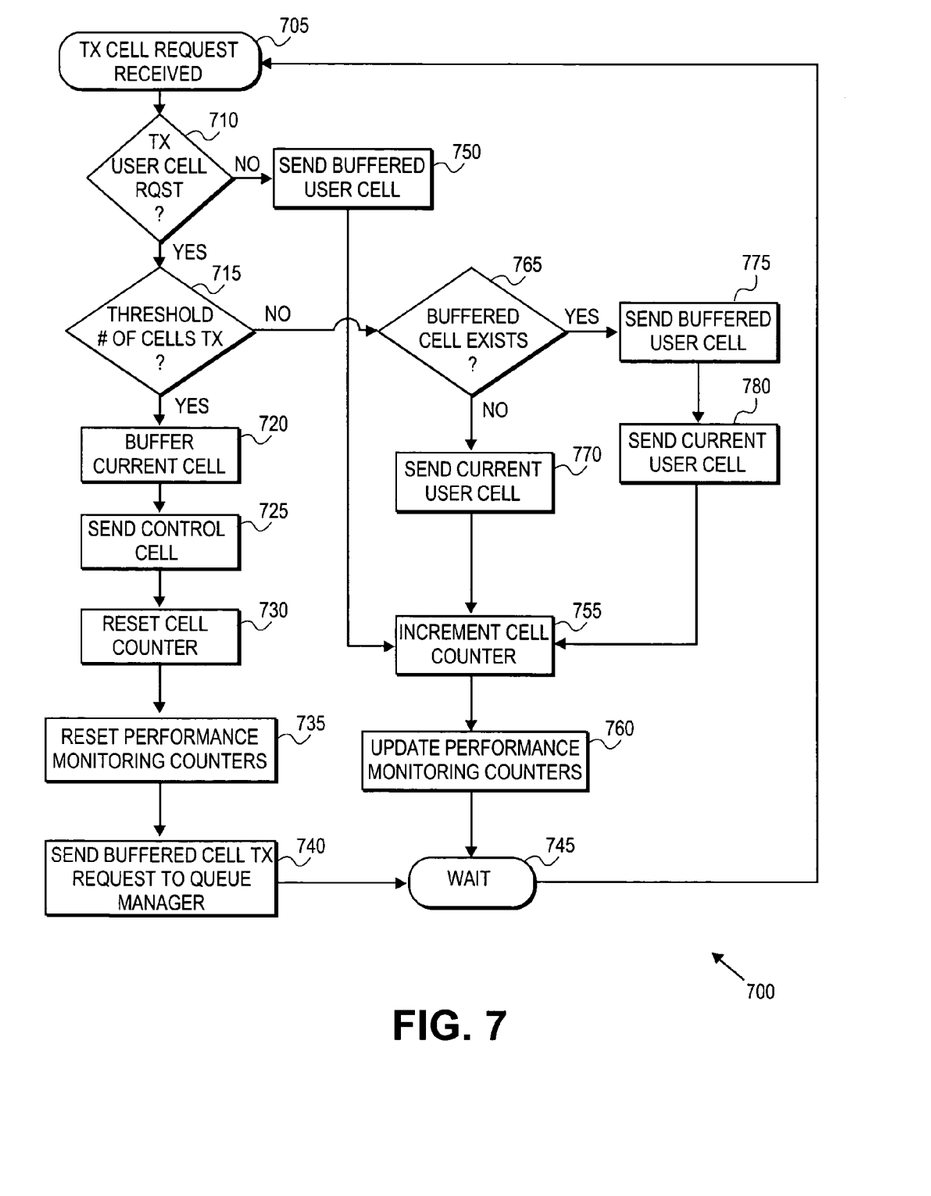
FIG. 7 is a flow chart illustrating operation of a transmit engine of a network processor, in accordance with an embodiment of the present invention.

FIG. 7 is a flow chart of a process 700 illustrating operation of transmit engine 330, in accordance with an embodiment of the present invention. In a process block 705, transmit engine 330 receives a transmit cell request from queue manager 320. If the transmit cell request is a transmit user cell request (decision block 710), then process 700 continues to a decision block 715.

In one embodiment, as transmit engine 330 transmits each user cell 210 onto network 100, it increments cell counter 505. In one embodiment, if cell counter 505 has reached a threshold number N of transmitted user cells 210 (decision block 715), then process 700 continues to a process block 720. In process block 720, transmit engine 330 buffers the current user cell of which queue manager 320 requested transmission in process block 705. In place of transmitting the current user cell, transmit engine 330 transmits a control cell, in a process block 725. Once the control cell is transmitted, transmit engine 330 resets cell counter 505 to zero and resets performance monitoring counters (process block 735). One of the performance monitoring counter reset in process block 735 may include a counter for generating the checksum (e.g., BIP-16) over a group of user cells. In response to buffering the current user cell, transmit engine 330 sends the buffered cell transmit request to queue manager 320 to request that an empty transmission slot be scheduled for a buffered user cell. Transmit engine 330 then waits in process block 745 until another transmit cell request is received in process block 705.

Returning to decision block 710, if the transmit cell request is a transmit buffered cell request, then the current transmission slot is an empty transmission slot allowing transmit engine 330 to catch-up. In this case, process 700 continues to a process block 750. In process block 750, transmit engine 330 transmits the currently buffered user cell onto network 100. Once the currently buffered user cell is transmitted, buffer 410 remains empty until the number of transmitted user cell reaches the threshold value N, and another control cell 205 is transmitted in place of a user cell 210. In a process block 755, cell counter 505 is incremented to reflect that the buffered user cell was transmitted in process block 750. In a process block 760, the performance monitoring counters are updated (e.g., update the accumulated checksum or BIP-16 value). Process 700 then waits in process block 745 until another transmit request is received from queue manager 320.

Returning to decision block 715, if the number of transmitted user cells has not reached the threshold value N, then process 700 continues to a decision block 765. In decision block 765, if buffer 410 does not currently buffer one of user cells 210, then transmit engine 330 immediately transmits the current user cell (process block 770), for which queue manager 320 requested transmission in process block 705. Subsequently, transmit engine 330 increments cell counter 505 (process block 755) and updates the performance monitoring counters (process block 760). Process 700 continues therefrom as described above.

Returning to decision block 765, if one of user cells 210 is currently buffered within buffer 410, then process 700 continues to a process block 775. In process block 775, transmit engine 330 transmits the currently buffered user cell. In a process block 780, transmit engine 330 buffers the current user cell for which queue manager 320 requested transmission in process block 705. Subsequently, transmit engine 330 increments cell counter 505 (process block 755) and updates the performance monitoring counters (process block 760). Process 700 continues therefrom as described above.

Figure 8A:
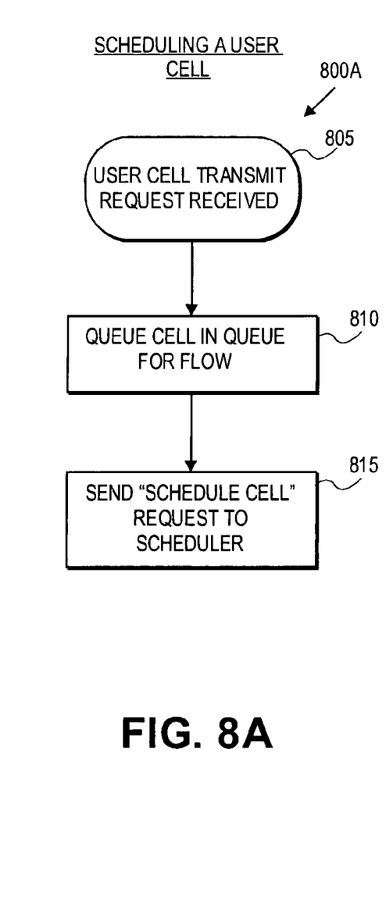
FIG. 8A-C are flow charts illustrating operation of a queue manager of a network processor, in accordance with an embodiment of the present invention.
Figure 8B:
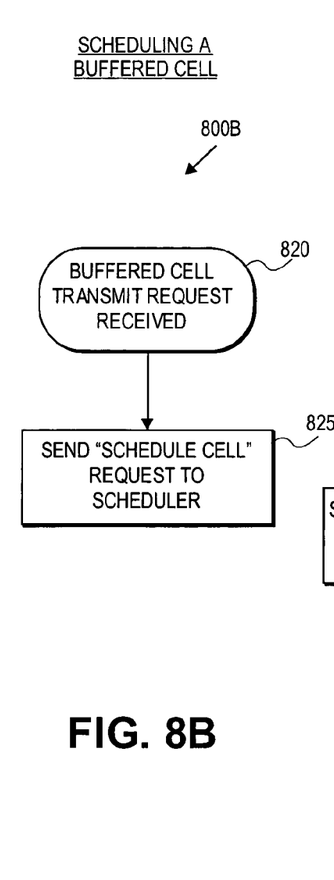
Figure 8C:
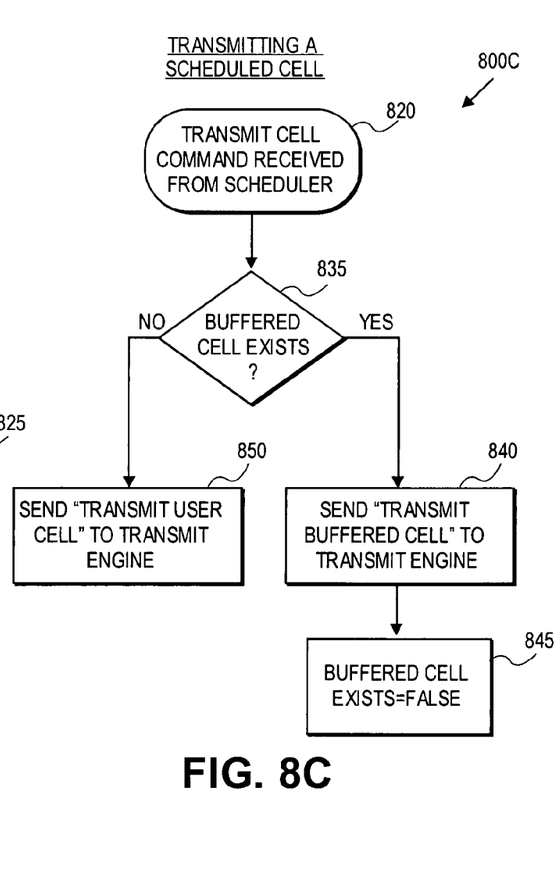

FIGS. 8A-C are flow charts illustrating the operation of queue manager 320, in accordance with an embodiment of the present invention. FIG. 8A illustrates a process 800A for scheduling a transmission slot for a user cell 210. In a process block 805, queue manager receives a user cell transmit request from request queue 315. In a process block 810, queue manager 320 queues the user cell to be transmitted in a physical queue(i) corresponding to a flow(i). In a process block 815, queue manager 320 sends a "schedule cell request" to scheduler 325. The schedule cell request is a signal requesting scheduler 325 to determine a transmission slot for the user cell to be transmitted. Scheduler 325 determines the transmission slot based on the specific scheduling algorithm executed (e.g., TM 4.1, DRR, and the like).

FIG. 8B illustrates a process 800B for scheduling a transmission slot for a buffered user cell. In a process block 820, queue manager 320 receives a buffered cell transmit request from transmit engine 330 via request queue 315. In one embodiment, a buffered cell exists status flag is set to TRUE, thereby indicating to queue manager 320 that the current cell transmit request is a buffered cell transmit request. In a process block 825, queue manger 320 sends a schedule cell request to scheduler 325. In response, scheduler 325 will determine an empty transmission slot for transmitting a buffered user cell.

FIG. 8C illustrates a process 800C for transmitting a scheduled cell. In a process block 830, after requesting scheduler 325 schedule a transmission slot in either process 800A or 800B, queue manager 320 receives a transmit cell command from scheduler 325. The transmit cell command indicates to queue manager 320 that the cell for which queue manager 320 requested scheduling should now be transmitted. It should be appreciated that many clock cycles and transmission slots can expire between transmitting a schedule cell request to scheduler 325 and receiving a transmit cell command from scheduler 325 for a particular cell. In a decision block 835, if the transmit cell command corresponds to a buffered cell transmit request (i.e., a buffered user cell exists), then queue manager 320 sends a transmit buffered cell request to transmit engine 330 (process block 840). In a process block 845, after transmit engine 330 transmits the currently buffered user cell, a buffered cell exists status flag is set to false to indicate that no user cells are currently buffered.

Returning to decision block 835, if the transmit cell command corresponds to a user cell transmit request, then process 800C continues to a process block 850. In process block 850, queue manager issues a transmit user cell request to transmit engine 330.

It should be appreciated that the flow charts illustrated in FIG. 6, 7, and 8A-C are only one possible embodiment of processes 600, 700, and 800A-C, respectively. Furthermore, it should be appreciated by one of ordinary skill having the benefit of the present disclosure that the order of the process blocks and decision blocks may be changed in some cases.

Figure 9:
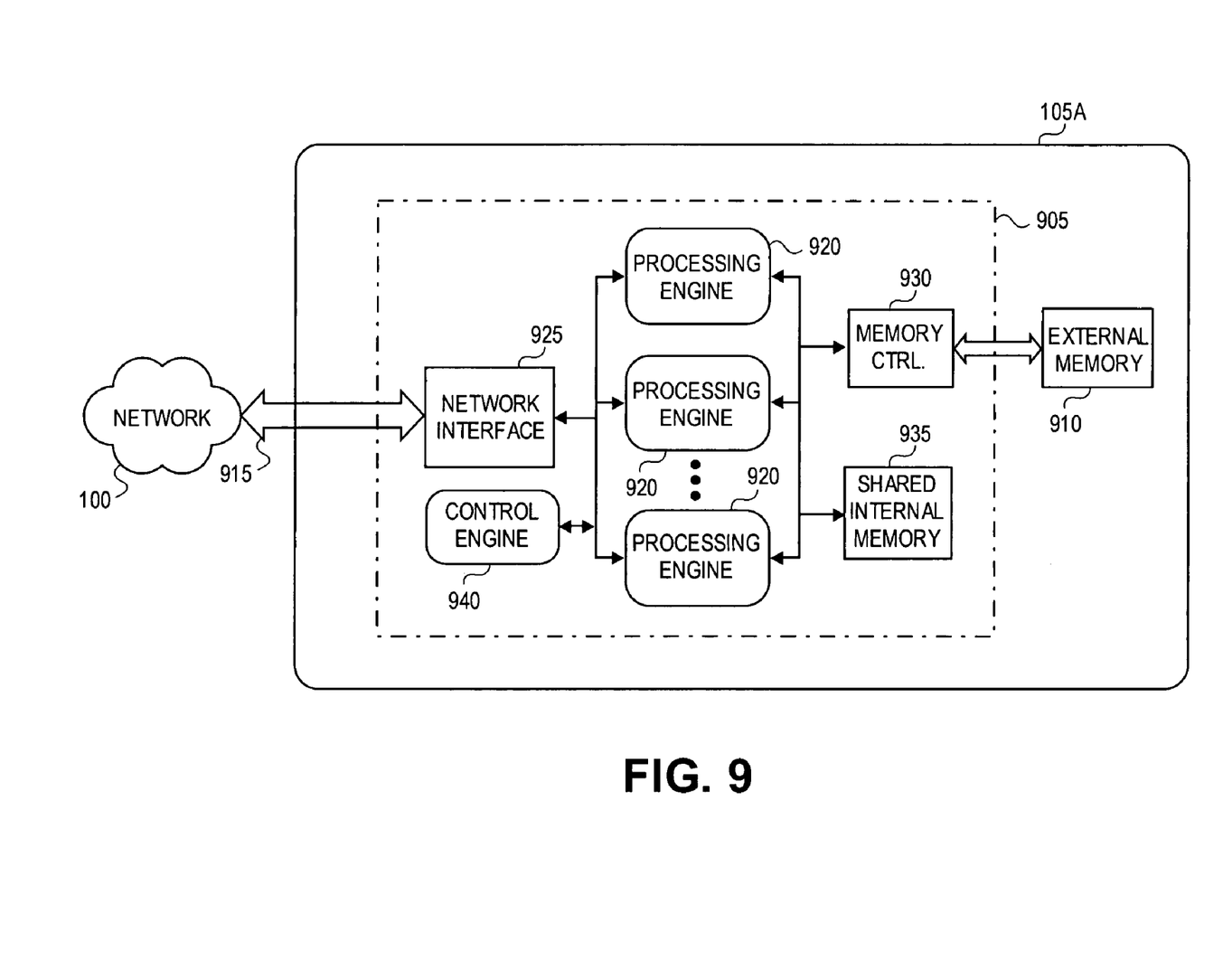
FIG. 9 is a block diagram of a network device including a network processor for inserting control cells into a stream of user cells, in accordance with an embodiment of the present invention.

FIG. 9 illustrates one embodiment of router 105A, in accordance with an embodiment of the present invention. The illustrated embodiment of router 105A includes a network processor 905, external memory 910, and network link interfaces 915. The illustrated embodiment of network processor 905 includes processing engines 920, a network interface 925, a memory controller 930, shared internal memory 935, and a control engine 940.

The elements of router 105A are interconnected as follows. Processing engines 920 are coupled to network interface 925 to receive and transmit flows F1 and F2 from/to network 100 via network-link interfaces 915. Processing engines 920 are further coupled to access external memory 910 via memory controller 930 and shared internal memory 935. Memory controller 930 and shared internal memory 935 may be coupled to processing engines 920 via a single bus or multiple buses to minimize delays for external accesses. Control engine 940 is coupled to one or more processing engines 920 to process control cells 205.

In one embodiment, processing engines 920 each correspond to one of receive engine 305, queue manager 320, scheduler 325, and transmit engine 330. Control engine 940 corresponds to control cell handler 310. Processing engines 920 may operate in parallel to achieve high data throughput. Typically, to ensure maximum processing power, each of processing engines 920 process multiple threads and can implement instantaneous context switching between threads. In one embodiment, processing engines 920 are pipelined and operate on one or more flows concurrently.

In one embodiment, the various performance counters discussed herein may be stored in external memory 910. In one embodiment, when multiple threads are processing a user cell on a given virtual circuit ("VC") or virtual path ("VP") that has performance monitoring enabled, only one of the threads actually fetches the performance counter and places a copy of it in shared internal memory 935. All other threads update the copy in shared internal memory 935. The last thread to process a user cell for a given VC or VP writes the copy back to external memory 910. This embodiment optimizes memory access times to the various performance counters. However, it should be appreciated that the performance counters, including the checksum (or BIP-16) should be updated for each of user cells 210 in the order in which user cells 210 are received and that each thread should access the performance counters one at a time.

It should be appreciated that various other elements of router 105A have been excluded from FIG. 9 and this discussion for the purposes of clarity. For example, router 105A may further include a CRC processing unit, a lookup Engine, a computer readable medium (e.g., hard disk), and the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   negotiating a traffic contract with a remote network user;
   receiving data user blocks from a queue manager;
   transmitting the data user blocks to the remote network user through a network from a transmit engine during transmission slots;
   buffering a first one of the data user blocks during a first transmission slot at the transmit engine;
   transmitting a performance monitoring control block from the transmit engine independent of higher layer protocols and without affecting the traffic contract through the network during the first transmission slot in place of the first one of the data user blocks;
   delaying transmission of the first one of the data user blocks at the transmit engine until a next transmission; and
   receiving an acknowledgement of receipt of the performance monitoring control block.

2. The method of claim 1, further comprising:
   scheduling an empty transmission slot in response to buffering the first one of the data user blocks;
   sequentially buffering the data user blocks subsequent to the first one for a period of one transmission slot each, prior to transmitting each of the data user blocks subsequent to the first one, until the empty transmission slot is a current transmission slot; and
   transmitting a currently buffered one of the data user blocks during the empty transmission slot to eliminate delaying the data user blocks subsequent to the currently buffered one of the data user blocks.

3. The method of claim 2 wherein the control block is periodically transmitted in place of one of the data user blocks after N transmission slots.

4. The method of claim 3 wherein the control block includes a checksum over the previous N data user blocks transmitted onto the network.

5. The method of claim 1 wherein the control block comprises one of a forward performance monitoring message and a backward reporting message for monitoring performance of the network.

6. The method of claim 1 wherein the data user blocks comprise asynchronous transfer mode ("ATM") user cells.

7. The method of claim 6 wherein buffering the first one of the data user blocks comprises buffering the first one of the data user blocks within a transmit micro-engine of an ATM network processor.

8. The method of claim 6 wherein the control block is inserted into a stream of the data user blocks without violating a traffic contract.

9. The method of claim 8 wherein the control block is inserted into the stream of the data user blocks every N data user blocks while executing a protocol using frames greater than N data user blocks in length and enqueued as a single unit.

10. A computer-readable medium having stored thereon instructions that, if executed by a computer, will cause the computer to perform operations comprising:
negotiating a traffic contract with a remote network user;
receiving data user blocks from a queue manager;
transmitting groups of data user blocks to the remote network user through a network, each of the data user blocks of each of the groups transmitted one at a time from a transmit engine during sequential transmission slots;
transmitting a performance monitoring control block onto the network from the transmit engine after a first group of data user blocks in place of a first data user block of a second group of data user blocks, the performance monitoring control block being transmitted from the transmit engine independent of higher layer protocols and without affecting the traffic contract;
buffering a first portion of the second group, each of the data user blocks of the first portion sequentially buffered for a period of one transmission slot prior to transmitting; and
receiving an acknowledgement of receipt of the performance monitoring control block.

11. The computer-readable medium of claim 10, further having stored thereon instructions that, if executed by the computer, will cause the computer to perform further operations, comprising:
scheduling an empty transmission slot in response to transmitting the control block, the empty transmission slot to eliminate a delay incurred by buffering each of the data user blocks of the first portion; and
transmitting each of the data user blocks of a second portion of the second group without buffering after the empty transmission slot is a current transmission slot.

12. The computer-readable medium of claim 10, further having stored thereon instructions that, if executed by the computer, will cause the computer to perform further operations, comprising
transmitting a new control block onto the network between each group of data user blocks.

13. The computer-readable medium of claim 12 wherein each group of data user blocks comprises N data user blocks.

14. The computer-readable medium of claim 12 wherein each group of data user blocks comprises a variable number of the data user blocks.

15. The computer-readable medium of claim 10 wherein the control block comprises an Operation and Management ("OAM") control block.

16. The computer-readable medium of claim 15 wherein the control block includes a checksum over the previous N data user blocks transmitted onto the network.

17. The computer-readable medium of claim 16 wherein the control block further includes a count of a number of the data user blocks transmitted.

18. The computer-readable medium of claim 10 wherein the data user blocks comprise asynchronous transfer mode ("ATM") user cells.

19. The computer-readable medium of claim 18 wherein transmitting the control block onto the network further comprises transmitting the control block onto the network without violating a traffic contract established with a user of the network.

20. A network processor, comprising:
a transmit engine to buffer and to transmit outbound data user blocks in accordance with a negotiated traffic contract and to transmit outbound performance monitoring control blocks, the control blocks being transmitted independent of higher layer protocols and without affecting the traffic contract;
a queue manager communicatively coupled to the transmit engine to provide the data user blocks to the transmit engine and to signal to the transmit engine to transmit the data user blocks, the transmit engine to transmit one of the outbound control blocks in place of one of the data user blocks and to buffer the one of the data user blocks for one transmission interval prior to transmitting; and
a receive engine to receive an acknowledgement of receipt of the performance monitoring control blocks.

21. The network processor of claim 20 wherein the transmit engine is further to:
signal to the queue manager to schedule a transmission interval to transmit a buffered data user block in response to buffering the one of the data user blocks; and
sequentially buffer subsequent data user blocks for one transmission interval prior to transmitting until the queue manager signals to the transmit engine to transmit the buffered data user block.

22. The network processor of claim 21 wherein the transmit engine includes a buffer to sequentially buffer the one of the data user blocks and the subsequent data user blocks one at a time.

23. The network processor of claim 21, further comprising a scheduler communicatively coupled to the queue manager to schedule transmission of the data user blocks, the outbound control blocks, and the buffered data user block in response to schedule requests from the queue manager.

24. The network processor of claim 20 wherein the transmit engine is further to periodically transmit one of the outbound control blocks after N data user blocks.

25. The network processor of claim 24 wherein the transmit engine transmits the outbound control blocks without the queue manager having advance notice.

26. The network processor of claim 20, further comprising:
a control handler to process inbound control blocks; and
a receive engine communicatively coupled to the control handler, the receive engine to receive the data user blocks and to deliver the data user blocks to a transport user, the receive engine further to receive the inbound control blocks and deliver the inbound control blocks to the control handler.

27. The network Processor of claim 20 wherein the data user blocks and the inbound control blocks comprise asynchronous transfer mode ("ATM") cells.

28. A system, comprising:
a router including:
an input port to receive asynchronous transfer mode ("ATM") user cells and inbound performance monitoring control cells and to receive acknowledgements of receipt of outbound performance monitoring cells;

a receive engine communicatively coupled to the input port o process the ATM user cells, the inbound control cells, and the acknowledgments;

an output port to output the ATM user cells received at the input port in accordance with a negotiated traffic contract and to output outbound performance monitoring control cells independent of higher layer protocols and without affecting the traffic contract;

a transmit engine communicatively coupled to the output port to buffer outbound ATM user cells; and a queue manager communicatively coupled to the transmit engine to provide the ATM user cells to the transmit engine and to signal to the transmit engine to transmit the ATM user cells, the transmit engine to transmit one of the outbound control cells in place of one of the ATM user cells and to buffer the one of the ATM user cells for one transmission interval prior to transmitting; and a source computer communicatively coupled to the input port of the router to transmit the ATM user cells to the router for transmission to a destination.

29. The system of claim 28 wherein the transmit engine is further to signal to the queue manager to schedule a transmission interval to transmit a buffered ATM user cell in response to buffering the one of the ATM user cells.

30. The system of claim 29 wherein the transmit engine is further to sequentially buffer subsequent ATM user cells for one transmission interval prior to transmitting until the queue manager signals to the transmit engine to transmit the buffered data user block.

31. The system of claim 30, further comprising a control cell handler to process the inbound control cells and wherein the receive engine is further coupled to direct the ATM user cells to a transport user and to direct the inbound control cells to the control cell handler.

* * * * *

UNITED STATES PATENT AND TRADEMARK OFFICE
CERTIFICATE OF CORRECTION

PATENT NO. : 7,414,976 B2  Page 1 of 1
APPLICATION NO. : 10/737485
DATED : August 19, 2008
INVENTOR(S) : Venkatachalam et al.

It is certified that error appears in the above-identified patent and that said Letters Patent is hereby corrected as shown below:

In column 13, at line 2, delete "o" and insert --to--.

Signed and Sealed this

Sixteenth Day of December, 2008

JON W. DUDAS
*Director of the United States Patent and Trademark Office*